(12) United States Patent
Bakin et al.

(10) Patent No.: US 7,991,240 B2
(45) Date of Patent: Aug. 2, 2011

(54) METHODS, SYSTEMS AND APPARATUSES FOR MODELING OPTICAL IMAGES

(75) Inventors: Dmitry Bakin, San Jose, CA (US); Pravin Rao, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 988 days.

(21) Appl. No.: 11/898,889

(22) Filed: Sep. 17, 2007

(65) Prior Publication Data

US 2009/0076754 A1    Mar. 19, 2009

(51) Int. Cl.
*G06K 9/40* (2006.01)
*G06T 17/00* (2006.01)

(52) U.S. Cl. ......................... 382/254; 345/428

(58) Field of Classification Search ......................... None
See application file for complete search history.

(56) References Cited

U.S. PATENT DOCUMENTS

| | | | | |
|---|---|---|---|---|
| 5,546,142 | A * | 8/1996 | Kobayashi | 351/237 |
| 6,285,799 | B1 * | 9/2001 | Dance et al. | 382/261 |
| 6,329,989 | B1 * | 12/2001 | Qi et al. | 345/428 |
| 6,408,107 | B1 | 6/2002 | Miller et al. | |
| 6,806,980 | B2 * | 10/2004 | Xu et al. | 358/474 |
| 7,190,395 | B2 * | 3/2007 | Nakano et al. | 348/241 |
| 7,860,675 | B2 * | 12/2010 | Miyano | 702/70 |
| 2003/0063815 | A1 | 4/2003 | Watanabe | |
| 2003/0184663 | A1 * | 10/2003 | Nakano et al. | 348/241 |
| 2003/0212491 | A1 | 11/2003 | Mitchell et al. | |
| 2004/0243364 | A1 | 12/2004 | Wendelin et al. | |
| 2005/0117114 | A1 * | 6/2005 | Jiang | 351/177 |
| 2005/0185159 | A1 | 8/2005 | Rosenbluth et al. | |
| 2005/0189491 | A1 | 9/2005 | Lewis | |
| 2005/0197809 | A1 | 9/2005 | Dowski, Jr. et al. | |
| 2005/0265621 | A1 | 12/2005 | Biggs et al. | |
| 2006/0101106 | A1 | 5/2006 | Subbarao | |
| 2006/0262403 | A1 | 11/2006 | Ludwig | |
| 2007/0044084 | A1 | 2/2007 | Wang et al. | |
| 2007/0047788 | A1 | 3/2007 | Slablaugh et al. | |
| 2008/0180466 | A1 * | 7/2008 | Whitehead et al. | 345/698 |
| 2009/0174638 | A1 * | 7/2009 | Brown Elliott et al. | 345/88 |

FOREIGN PATENT DOCUMENTS

| | | |
|---|---|---|
| EP | 0 466 252 A2 | 1/1992 |
| JP | 4177302 | 6/1992 |
| JP | 2003-052633 | 2/2003 |
| JP | 2006-351017 | 12/2006 |
| MX | PA03005650 | 12/2004 |

OTHER PUBLICATIONS

Thomas P. Costello, et al., "Asymmetric, Space-Variant Point Spread Function Model for a Spherical Lens Optical System," Proceedings of the 1999 IEEE International Symposium, Jul. 1999, vol. 4, pp. 64-67.

(Continued)

*Primary Examiner* — Yuzhen Ge
(74) *Attorney, Agent, or Firm* — Jason Tsai

(57) ABSTRACT

Methods, systems and apparatuses for modeling high resolution images which significantly shortens computation time and reduces image artifacts, as compared to known methods. Embodiments implement a look-up table, to compute once and store the point spread functions for various points of an image. During modeling of the optical system, previously stored point spread functions may be used to determine the point spread function for a specified point using a weighted interpolation of the point spread functions that have been stored for nearby points.

9 Claims, 15 Drawing Sheets

OTHER PUBLICATIONS

Thomas P. Costello, et al., "A Reduced Order Point Spread Function Model for Physical Optical System," IEEE Conference, 2001, vol. 1, pp. 41-44.

Reginald L. Lagendijk, et al., "Basic Methods for Image Restoration and Identification," Delft University of Technology, The Netherlands, Feb. 15, 1999 (25 pages).

Deepa Kundur, et al., "A Novel Approach to Multispectral Blind Image Fusion," Canadian Department of National Defense, no date (11 pages). available at http://www.ee.tamu.edu/-deepa/.pdf/spie3067.pdf.

Dr. Darko Vasiljević, "Program for Optical System Design and Optimization," no date (10 pages) available at http://www.diginaut.com/shareware/ados/documents/descript/descript.pdf.

* cited by examiner

| WAVELENGTH (λ) | RADIAL BAND (r) | ANGULAR POSITION (θ) | PSF (λ,r,θ) |
|---|---|---|---|
| $\lambda_0$ | $r_0$ | 0° | PSF (0,0,0) |
| $\lambda_0$ | $r_0$ | 1° | PSF (0,0,1) |
| $\lambda_0$ | $r_0$ | 2° | PSF (0,0,2) |
| $\lambda_0$ | $r_0$ | ⋮ | ⋮ |
| $\lambda_0$ | $r_0$ | 357° | PSF (0,0,357) |
| $\lambda_0$ | $r_0$ | 358° | PSF (0,0,358) |
| $\lambda_0$ | $r_0$ | 359° | PSF (0,0,359) |
| | | | |
| $\lambda_0$ | $r_1$ | 0° | PSF (0,1,0) |
| $\lambda_0$ | $r_1$ | 1° | PSF (0,1,1) |
| $\lambda_0$ | $r_1$ | 2° | PSF (0,1,2) |
| $\lambda_0$ | $r_1$ | ⋮ | ⋮ |
| $\lambda_0$ | $r_1$ | 357° | PSF (0,1,357) |
| $\lambda_0$ | $r_1$ | 358° | PSF (0,1,358) |
| $\lambda_0$ | $r_1$ | 359° | PSF (0,1,359) |
| | | | |
| $\lambda_0$ | $r_2$ | 0° | PSF (0,2,0) |
| $\lambda_0$ | $r_2$ | 1° | PSF (0,2,1) |
| $\lambda_0$ | $r_2$ | 2° | PSF (0,2,2) |
| $\lambda_0$ | $r_2$ | ⋮ | ⋮ |
| $\lambda_0$ | $r_2$ | 357° | PSF (0,2,357) |
| $\lambda_0$ | $r_2$ | 358° | PSF (0,2,358) |
| $\lambda_0$ | $r_2$ | 359° | PSF (0,2,359) |

FIG. 6A

| WAVELENGTH (λ) | RADIAL BAND (r) | ANGULAR POSITION (θ) | PSF (λ,r,θ) |
|---|---|---|---|
| $\lambda_1$ | $r_0$ | 0° | PSF (1,0,0) |
| $\lambda_1$ | $r_0$ | 1° | PSF (1,0,1) |
| $\lambda_1$ | $r_0$ | 2° | PSF (1,0,2) |
| $\lambda_1$ | $r_0$ | ⋮ | ⋮ |
| $\lambda_1$ | $r_0$ | 357° | PSF (1,0,357) |
| $\lambda_1$ | $r_0$ | 358° | PSF (1,0,358) |
| $\lambda_1$ | $r_0$ | 359° | PSF (1,0,359) |
| | | | |
| $\lambda_1$ | $r_1$ | 0° | PSF (1,1,0) |
| $\lambda_1$ | $r_1$ | 1° | PSF (1,1,1) |
| $\lambda_1$ | $r_1$ | 2° | PSF (1,1,2) |
| $\lambda_1$ | $r_1$ | ⋮ | ⋮ |
| $\lambda_1$ | $r_1$ | 357° | PSF (1,1,357) |
| $\lambda_1$ | $r_1$ | 358° | PSF (1,1,358) |
| $\lambda_1$ | $r_1$ | 359° | PSF (1,1,359) |
| | | | |
| $\lambda_1$ | $r_2$ | 0° | PSF (1,2,0) |
| $\lambda_1$ | $r_2$ | 1° | PSF (1,2,1) |
| $\lambda_1$ | $r_2$ | 2° | PSF (1,2,2) |
| $\lambda_1$ | $r_2$ | ⋮ | ⋮ |
| $\lambda_1$ | $r_2$ | 357° | PSF (1,2,357) |
| $\lambda_1$ | $r_2$ | 358° | PSF (1,2,358) |
| $\lambda_1$ | $r_2$ | 359° | PSF (1,2,359) |

FIG. 6B

| WAVELENGTH (λ) | RADIAL BAND (r) | ANGULAR POSITION (θ) | PSF (λ,r,θ) |
|---|---|---|---|
| $\lambda_2$ | $r_0$ | 0° | PSF (2,0,0) |
| $\lambda_2$ | $r_0$ | 1° | PSF (2,0,1) |
| $\lambda_2$ | $r_0$ | 2° | PSF (2,0,2) |
| $\lambda_2$ | $r_0$ | ⋮ | ⋮ |
| $\lambda_2$ | $r_0$ | 357° | PSF (2,0,357) |
| $\lambda_2$ | $r_0$ | 358° | PSF (2,0,358) |
| $\lambda_2$ | $r_0$ | 359° | PSF (2,0,359) |
| $\lambda_2$ | | | |
| $\lambda_2$ | $r_1$ | 0° | PSF (2,1,0) |
| $\lambda_2$ | $r_1$ | 1° | PSF (2,1,1) |
| $\lambda_2$ | $r_1$ | 2° | PSF (2,1,2) |
| $\lambda_2$ | $r_1$ | ⋮ | ⋮ |
| $\lambda_2$ | $r_1$ | 357° | PSF (2,1,357) |
| $\lambda_2$ | $r_1$ | 358° | PSF (2,1,358) |
| $\lambda_2$ | $r_1$ | 359° | PSF (2,1,359) |
| $\lambda_2$ | | | |
| $\lambda_2$ | $r_2$ | 0° | PSF (2,2,0) |
| $\lambda_2$ | $r_2$ | 1° | PSF (2,2,1) |
| $\lambda_2$ | $r_2$ | 2° | PSF (2,2,2) |
| $\lambda_2$ | $r_2$ | ⋮ | ⋮ |
| $\lambda_2$ | $r_2$ | 357° | PSF (2,2,357) |
| $\lambda_2$ | $r_2$ | 358° | PSF (2,2,358) |
| $\lambda_2$ | $r_2$ | 359° | PSF (2,2,359) |

FIG. 6C

METHODS, SYSTEMS AND APPARATUSES FOR MODELING OPTICAL IMAGES

FIELD OF THE INVENTION

Disclosed embodiments relate generally to modeling systems and more particularly to methods, systems and apparatuses for modeling an optical system.

BACKGROUND OF THE INVENTION

When designing optical systems, such as cameras, sensors, optical instruments, electro-optical devices, etc., designers use computational modeling to test the performance of the designs. By modeling the scene image output of optical systems, designers can predict errors before the optical system is made or deployed. Therefore, these errors can be corrected before the optical system is actually built. Thus, modeling the scene image output saves both time and resources that could have been wasted by building a design that does not meet the desired specification.

FIG. 1 illustrates a typical optical system 1. As light rays 30 from an object scene pass through a lens 10, they intercept an image plane 40, thereby forming an image on the plane 40. In FIG. 1, the image plane 40 happens to be located on an image sensor 20, so the image formed on the image plane 40 corresponds to the image received at image sensor 20.

FIG. 2a illustrates an image 50 formed at the image plane 40 of the optical system 1 (FIG. 1). In order to model this image, designers view the image as having many points, such as point P. Through computation, designers are able to determine the image characteristics of the image 50 at the various points P throughout the image 50. Image characteristics might vary depending on qualities associated with the lens 10, such as the lens prescription.

Designers are able to specify the location of points P in the image using a polar coordinate system, such as that illustrated in FIG. 2b. Specifically, in a polar coordinate system, each point can be described by a radial distance r and an angle θ. Distance rp represents the length between the origin O of the polar coordinate system and the selected point P in the image 50. For example, FIG. 2b shows a point P that is rp length units away from the origin O. The length rp may be represented using nanometers or any other unit of length. Angle θ represents the angle between the selected point P and the polar axis x. For example, point P in FIG. 2b is θp angular units away from the polar axis (e.g., 0°). The angle θ may be represented using degrees, radians, or any other unit for describing an angle.

In addition to modeling characteristics at a point P in the image 50 according to the point's physical location (rp, θp), designers may also model characteristics specific to different wavelengths of light at point P. Thus, wavelength λp is also associated with point P.

One particular image characteristic that designers would like to have information about before building an optical system is the impulse response at various points and wavelengths in a simulated image. This impulse response is also known as the point spread function. The point spread function of an optical system is a widely used characteristic that describes the response of the optical system to a point source or a point object and also describes the amount of blur introduced into a recorded image. Traditionally, optical ray tracing programs, such as ZEMAX®, available from ZEMAX® Development Corp., 3001 112th Ave. NE, Bellevue, Wash. 98004, have been used to compute this data for each point in the image. However, modeling using ray tracing to determine the point spread function for each point in the image is impractical because of its high computational demands, especially as image sizes and resolutions have increased. Known methods also result in undesirable image artifacts in the simulated image.

Accordingly, there exists a need in the art for improved techniques for determining the point spread function at points in a simulated image from an optical system.

BRIEF DESCRIPTION OF THE DRAWINGS

FIGS. 6a-6c further illustrate the look-up table of FIGS. 5a-5b in accordance with disclosed embodiments.

DETAILED DESCRIPTION

In the following detailed description, reference is made to the accompanying drawings which form a part hereof, and in which are shown, by way of illustration, specific embodiments. These embodiments are described in sufficient detail to enable those skilled in the art to make and use them, and it is to be understood that structural, logical or procedural changes may be made. Particularly, in the description below, processes are described by way of flowchart. In some instances, steps which follow other steps may be reversed, be in a different sequence or be in parallel, except where a following procedural step requires the presence of a prior procedural step.

Figure 3:
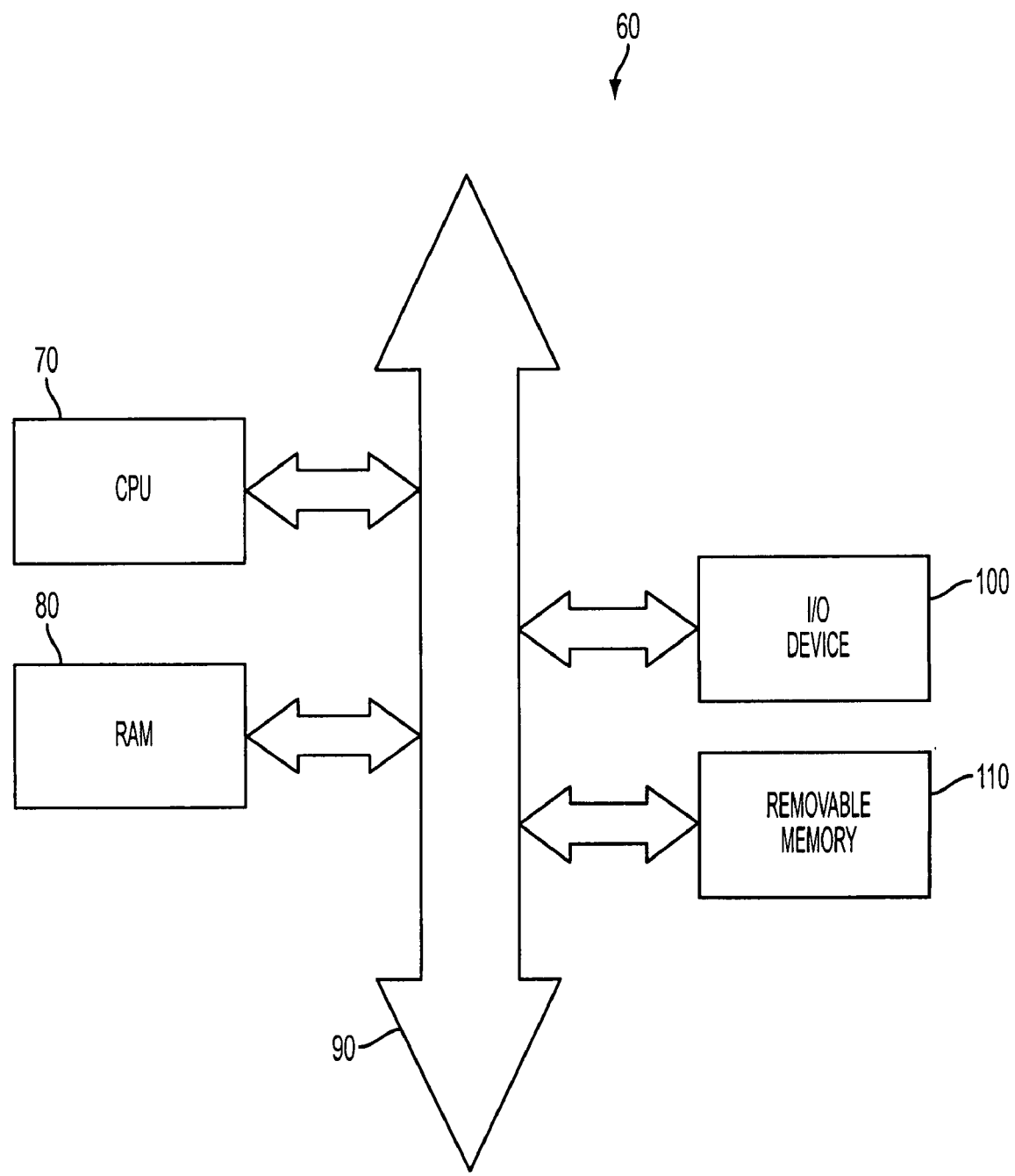
FIG. 3 illustrates a data processing system in accordance with disclosed embodiments.

Disclosed embodiments may be implemented using any type of data processing system. FIG. 3 illustrates one example of such a data processing system 60. Specifically, FIG. 3 shows the basic components of a computer system 60, including a central processing unit (CPU) 70, which executes software instructions, random access memory (RAM) 80, an input/output (I/O) device 100, removable memory 110, and a data bus 90 that allows the other parts of the system 60 to communicate. As is known in the art, computer system 60 can be operated according to software instructions stored in any of its various memories. Methods of programming the system 60 to implement the disclosed embodiments are also known in the art. Additionally, while one could use the system 60 to implement the various disclosed embodiments, one could also use any other type of data processing system.

Disclosed embodiments provide methods, systems and apparatuses for modeling high resolution images that significantly shortens computation time and reduces image artifacts, as compared to known methods. Embodiments implement a look-up table, to compute once and store the point spread functions for various combinations of location (r, θ) and wavelength (λ), representing various points of the image 50. During modeling of the optical system, these previously stored point spread functions may be used to determine the point spread function for a specified point using a weighted interpolation of the point spread functions that have been stored for nearby points. The embodiments do not require the computation heavy ray tracing technique for each point in the image. This significantly reduces the computation time required for optical system modeling.

Figure 4:
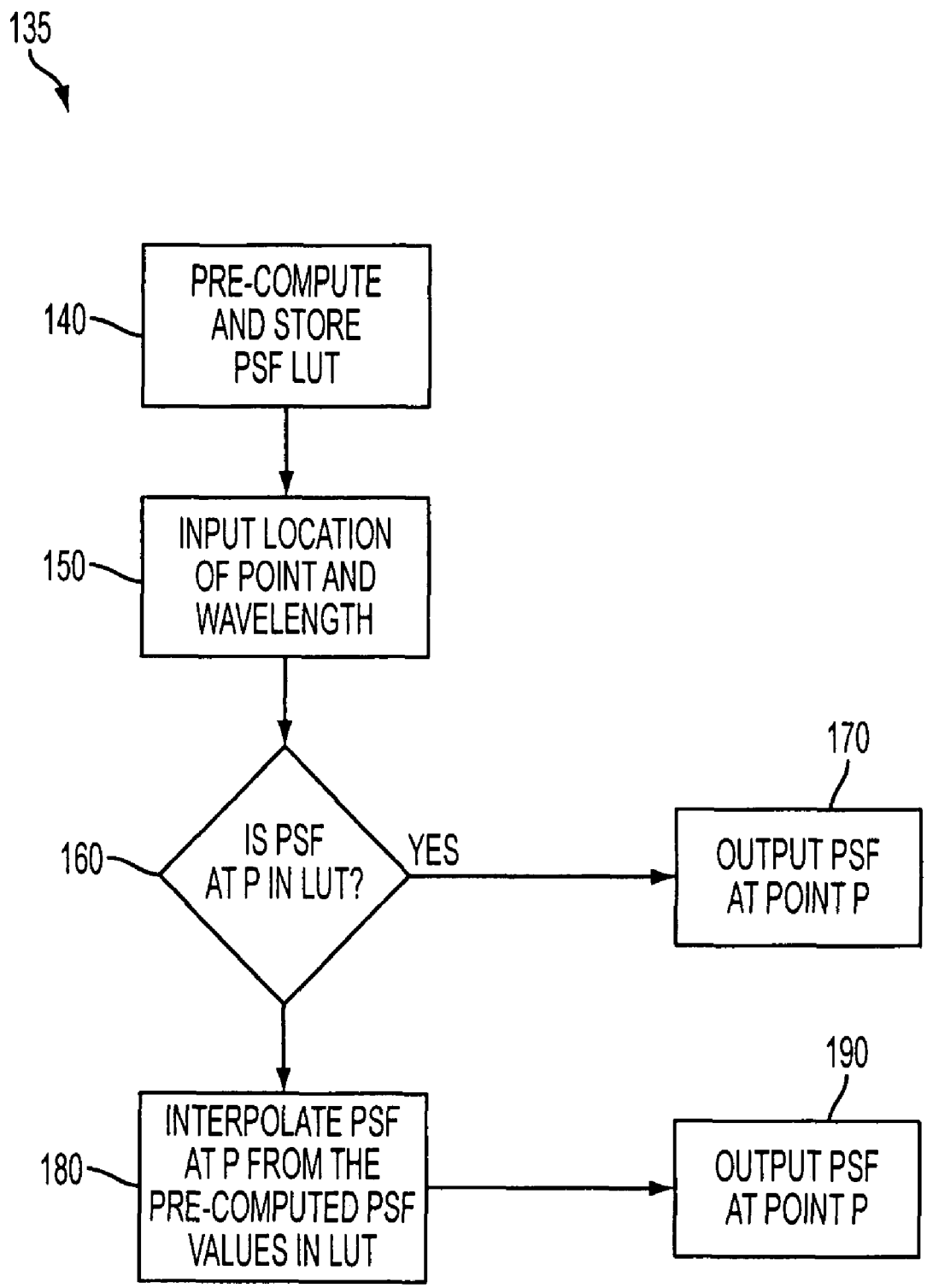
FIG. 4 illustrates a method of determining a point spread function at a point on an image scene in accordance with disclosed embodiments.

Referring now to FIG. 4, one disclosed embodiment is now described in more detail. FIG. 4 is a flowchart illustrating an overall method 135 performed by data processing system 60. First, at step 140, the method 135 computes and stores a look-up table ("LUT") that associates point spread functions ("PSF"s) with various points, described as combinations of location (r, θ) and wavelength (λ). As previously described, a point spread function describes the response of the optical system to a point source or a point object as well as the amount of blur introduced into a recorded image. As described in more detail below, the look-up table represents a model of an image 50 formed on an image plane 40 in optical system 1. The look-up table could be generated with the same data processing system 60 used to perform the other steps shown in FIG. 4 or with a different data processing system. The look-up table may contain, for example, 360 stored point spread functions for each wavelength as opposed to the indefinite number of point spread functions which may need to be modeled for a given wavelength.

At step 150, the location (in polar coordinates) of a point P in image 50 and a wavelength of light for a point for which modeling is desired is input into system 60. At step 160, method 135 determines whether the look-up table contains a stored location and wavelength that exactly matches the input location and wavelength. If the look-up table includes the exact combination of location (r, θ) and wavelength (λ), then method 135 outputs the point spread function associated with the location and wavelength at step 170. If method 135 determines that the input location and wavelength do not exactly match values stored in the look-up table, then method 135 performs interpolation operations at step 180. The point spread function based on the interpolation is output at step 190. As will be explained in more detail below, the interpolation operations determine a point spread function for the input point's location and wavelength, based on the point spread functions stored in the look-up table that are associated with points near the input point's location and/or wavelength. Each of the steps illustrated in FIG. 4 is described in greater detail below.

Figure 5A:
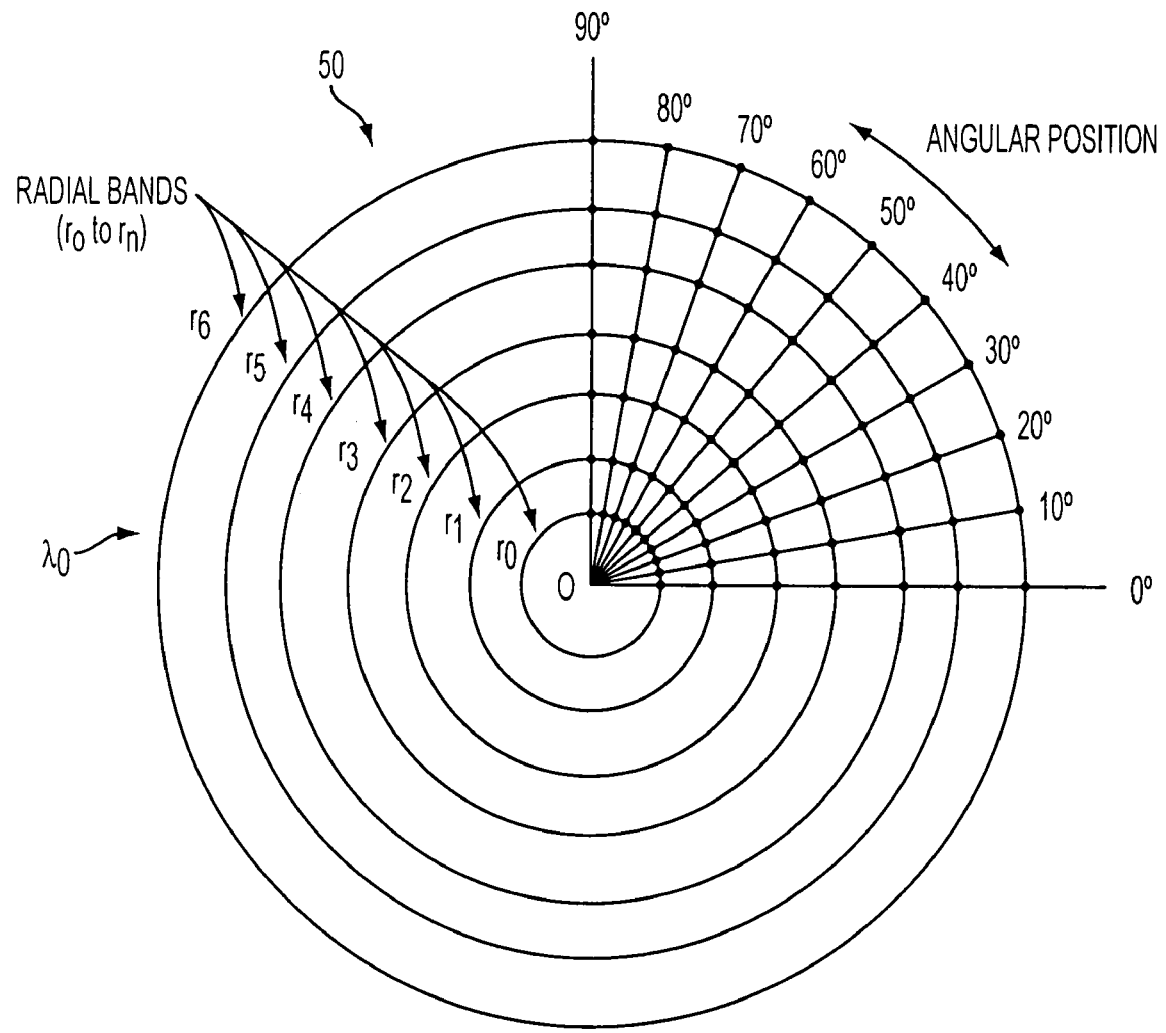
FIGS. 5a-5b illustrate a look-up table in accordance with disclosed embodiments.
Figure 5B:
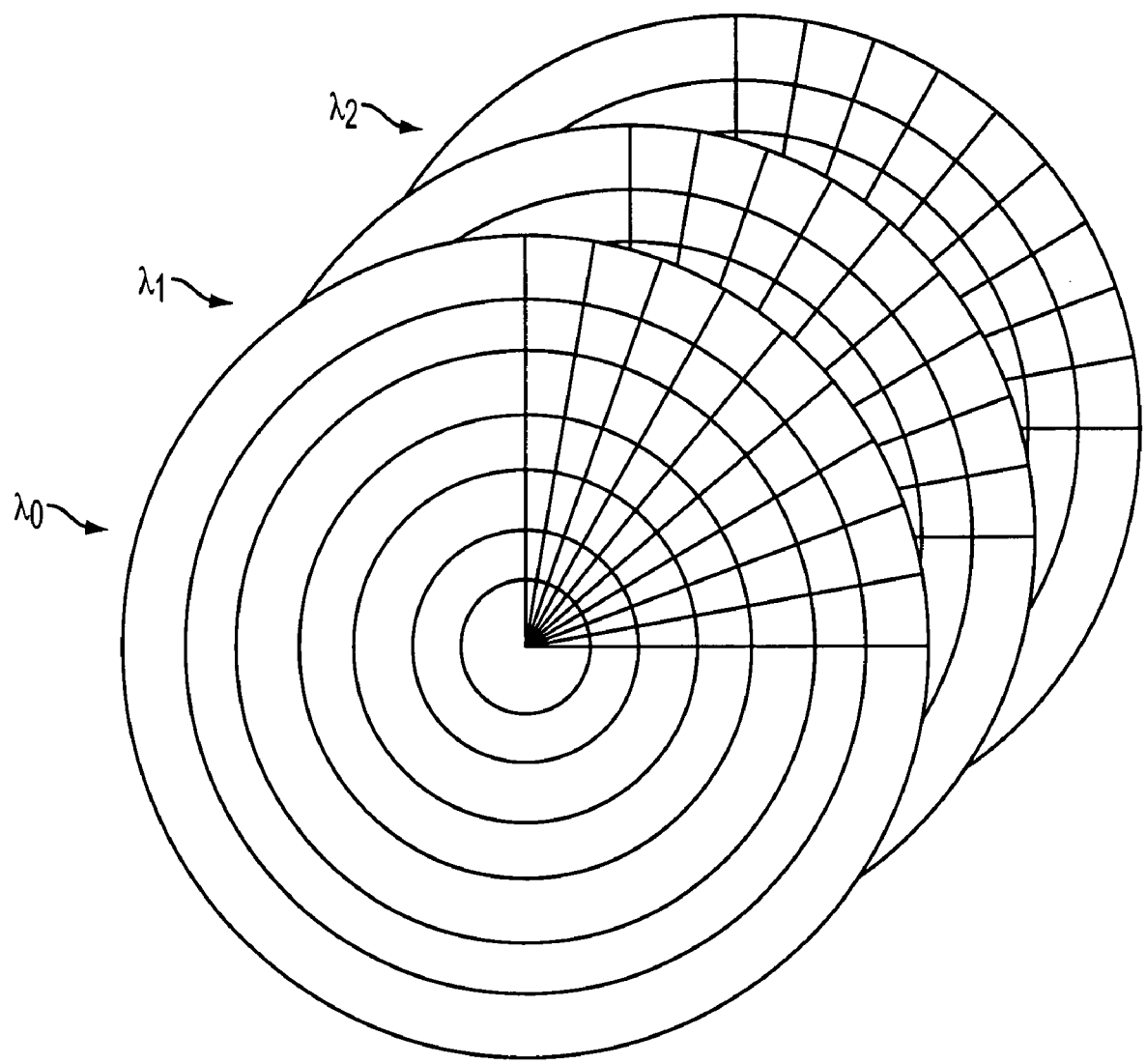

With reference to FIGS. 5a and 5b, the determination of the look-up table values (step 140) is now described in more detail. FIG. 5a illustrates an image 50 to which a portion of a look-up table corresponds. For a given wavelength, in this case λ0, the image 50 is divided into a set of radial bands, r0 to rn, during step 140. Each radial band has a "radial height," which is the band's distance from a point in image 50 designated as the origin O. In disclosed embodiments, the distance between the radial bands is the same; however embodiments of the invention are not limited as such. Also during step 140, the image 50 may also be divided into a set of angular positions. FIG. 5a shows image 50 divided into seven radial bands (r0 to r6) and 36 angular positions (0°, 10°, . . . , 340°, 350°)

Note, only the angular positions from 0° to 90° are shown in FIG. 5a. It should also be noted that the numbers of radial bands and angular positions are not limited to those shown in FIG. 5a. For example, the look-up table could include 360 angular positions (every 1°). Larger look-up tables will provide a higher accuracy, but as a trade off, they require more processing time to compute and to utilize during subsequent modeling steps.

The look-up table based on the image 50 shown in FIG. 5a includes stored point spread functions associated with the intersection of each angular position and radial band (shown as ● in FIG. 5a). Methods of determining these point spread function values are well known; one way the determination can be done is using ray tracing programs, such as ZEMAX®, available from ZEMAX® Development Corp., 3001 112th Ave. NE, Bellevue, Wash. 98004. The point spread functions are based on characteristics of the optical system, such as the lens prescription. For example, by modeling the optical system shown in FIG. 1 using ray tracing systems, designers can determine the point spread functions of image 50 at radial bands r0 to r6 for angular positions of 0°, 10°, 20°, etc. In other embodiments, designers are able to generate a look-up table associated with any image plane in optical system 1, such as image planes located between lens 10 and image sensor 20, using the same such ray tracing programs, and are not limited to images formed at image plane 40.

FIG. 5b illustrates a set of images 50 to which a larger portion of the look-up table corresponds. As can be seen from FIG. 5b, point spread functions can also be determined based on various wavelengths in addition to various radial bands and angular positions. For example, using known methods, such as ray tracing programs like ZEMAX® according to lens prescriptions, one can determine a set of point spread functions for the first wavelength λ0 as well as for other wavelengths, such as λ1 and λ2 shown in FIG. 5b. Individual point spread functions are each associated with a specific combination of wavelength, radial band, and angular position.

In one disclosed embodiment, point spread functions are determined for a variety of wavelengths that are within the visible spectrum of light. For example, the spectrum of light visible to the human eye can be divided into bands, then point spread functions are determined for each wavelength in the middle of each band. In such an embodiment, for the spectrum of light between 400 nm to 700 nm, one could generate point spread functions in 10 nm intervals (400 nm, 410 nm, 420 nm, etc. up to 700 nm). In a similar manner where the number of radial bands and angular positions may be varied to accommodate the simulation requirements, the wavelength interval could also be varied. Additionally, if point spread functions values are generated for only every 50 nm of wavelength instead of every 10 nm, a look-up table requiring even less memory storage space could be generated.

FIG. 6a is a table representing a portion of a look-up table for a single wavelength (λ0). The table of FIG. 6a corresponds to a diagram similar to that of FIG. 5a, but includes data representing only three radial bands (r0 to r2) and 360 angular positions (0° to 359°). The rightmost column includes each point spread function associated with the corresponding combination of wavelength λ, radial band r, and angular position θ shown in the adjacent columns of the same row.

FIGS. 6b and 6c represent additional portions of the look-up table (similar to FIG. 6a). FIG. 6b includes point spread functions for wavelength λ1. FIG. 6c includes point spread functions for wavelength λ2. Together FIGS. 6a, 6b and 6c represent, in tabular form, a diagram similar to that of FIG.

5b, except FIGS. 6a, 6b and 6c only include data for three radial bands and include data for 360 angular positions.

Figure 1:
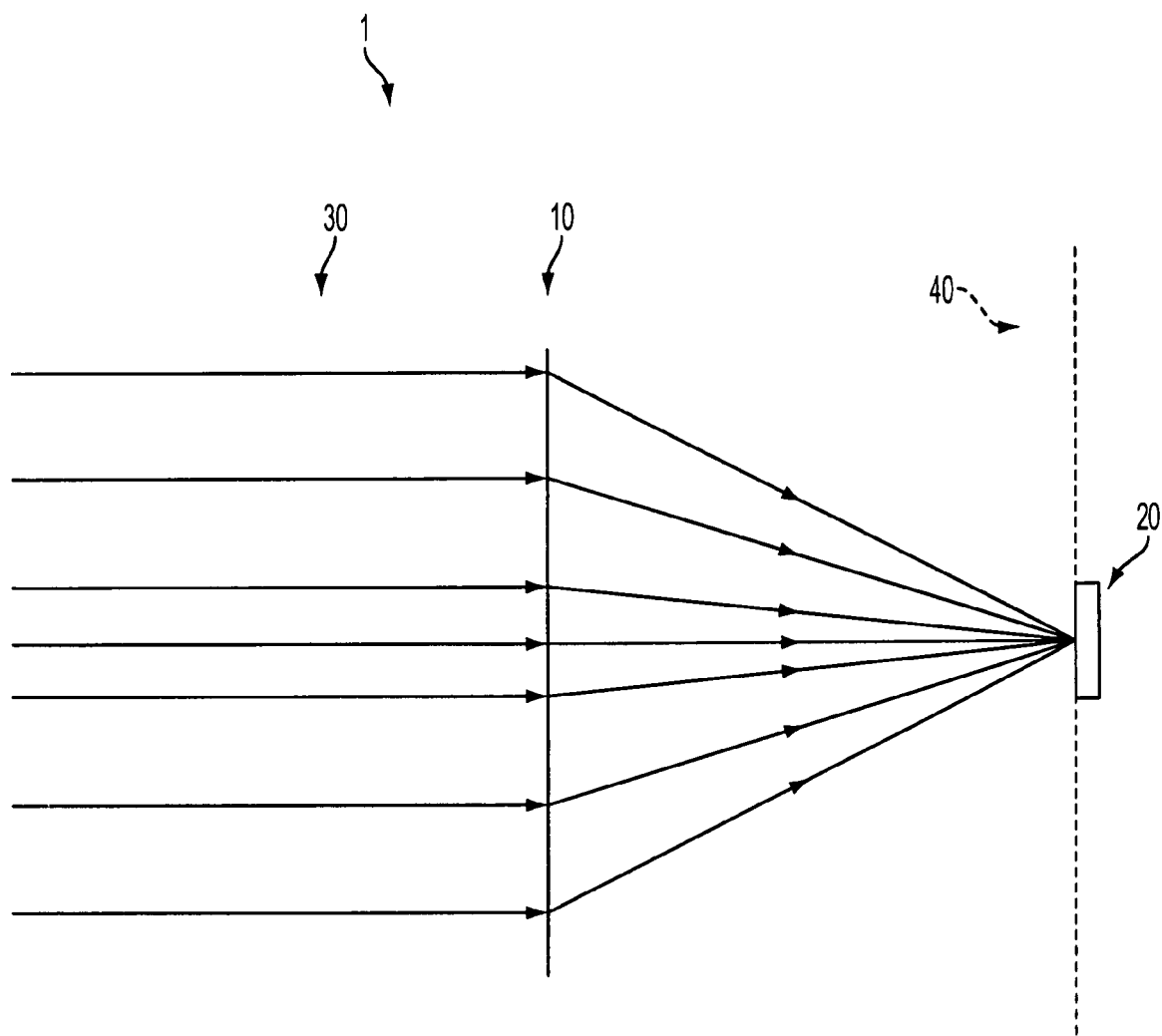
FIG. 1 illustrates an optical system.
Figure 2A:
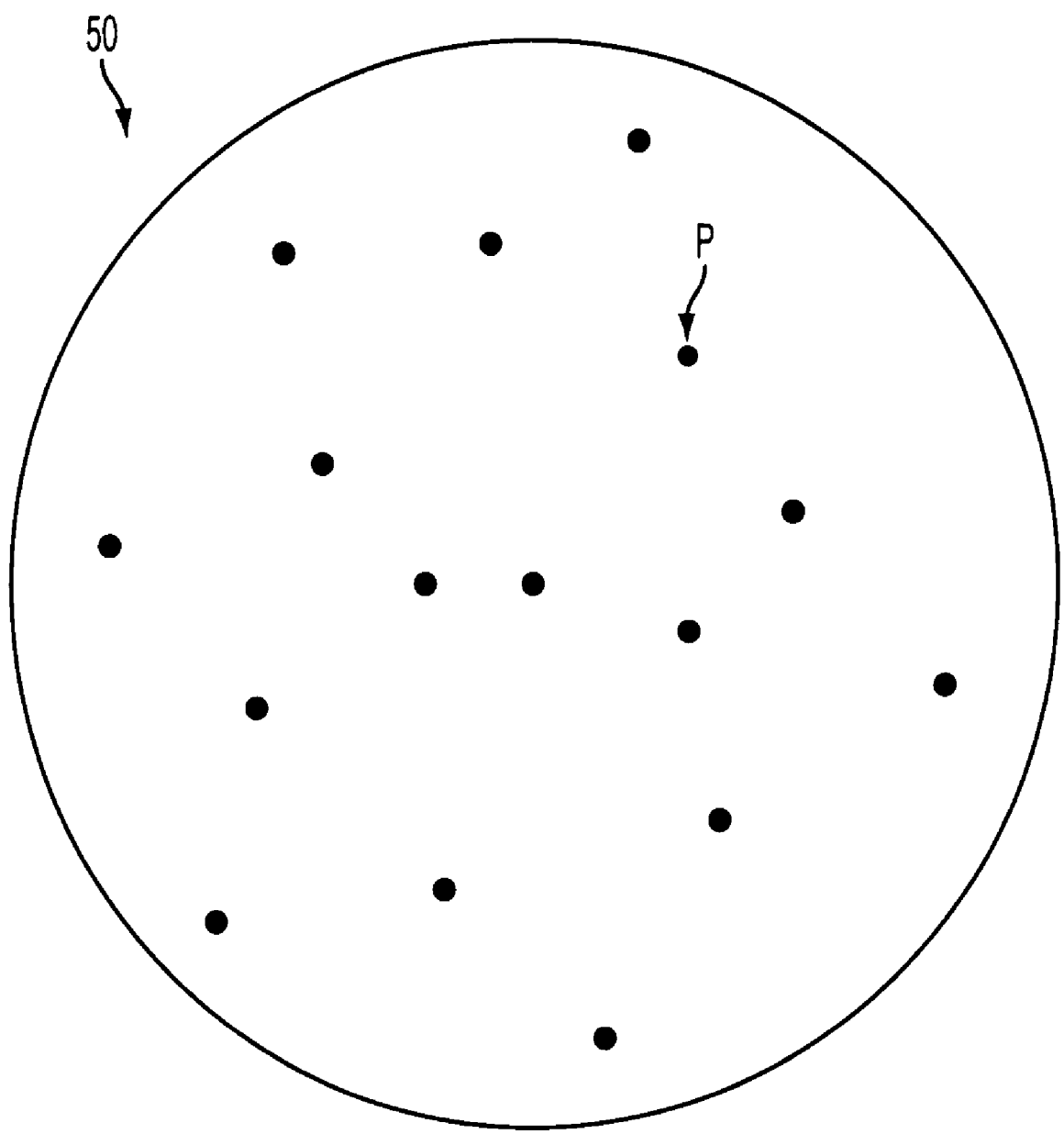
FIG. 2a illustrates an image scene formed on an image plane.
Figure 2B:
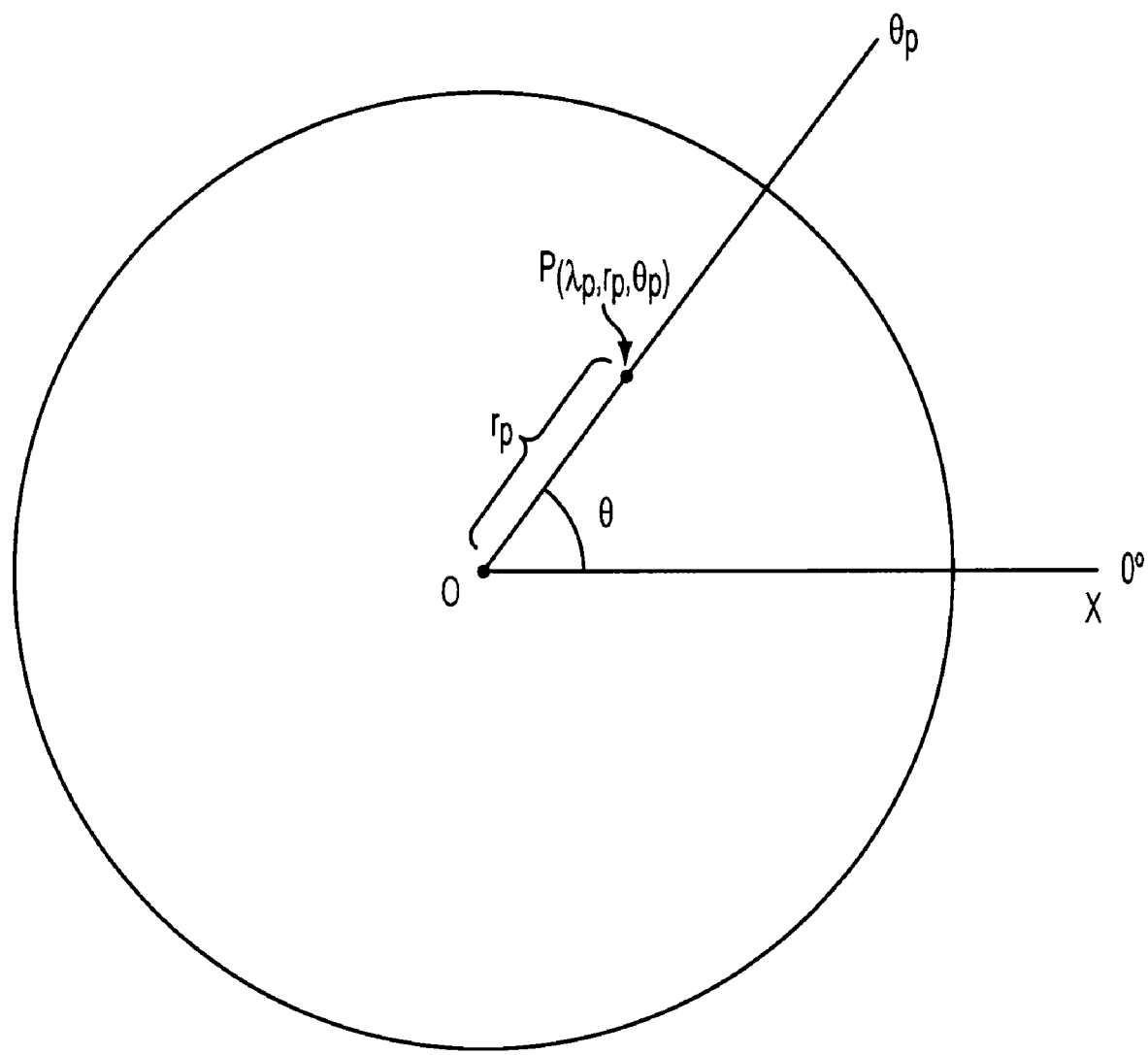
FIG. 2b illustrates an image scene formed on an image plane, illustrating a polar coordinate system.

Referring back to FIGS. 3 and 4, once the look-up table is computed and stored in system 60 (step 140), it can then be used to determine the point spread function for any point and wavelength on the image 50 formed at image plane 40 (FIG. 1). At step 150 the polar coordinate and wavelength of a point Pn is input into the method 135. If the polar coordinate and wavelength of the point Pn perfectly matches a polar coordinate and wavelength already stored in the look-up table, the s method 135 can simply output the point spread function associated with the input polar coordinate and wavelength (step 170). However, if the polar coordinate and wavelength of Pn is not stored in the look-up table, then at step 180 the method 135 performs an interpolation process, which is described below.

Figure 7:
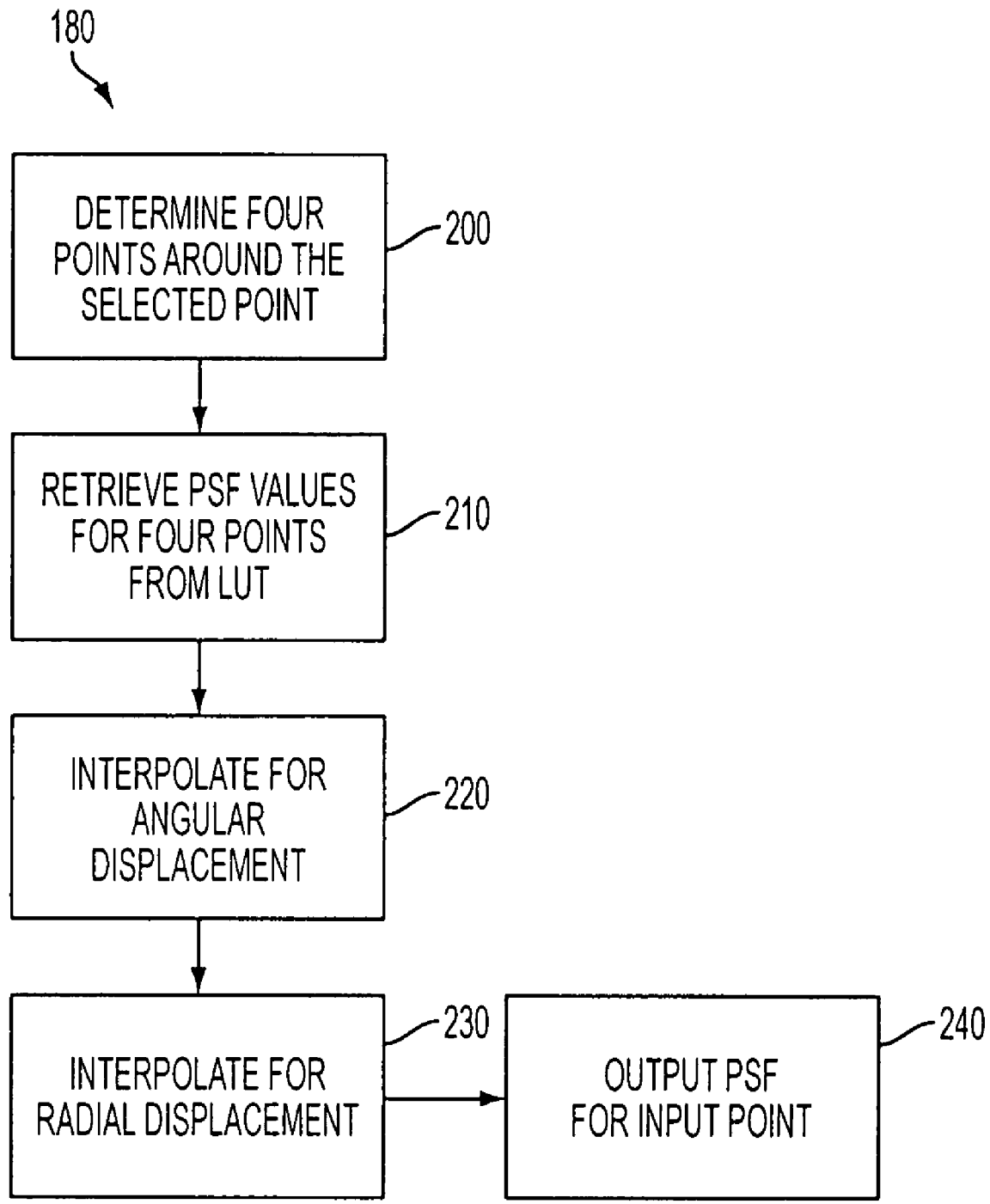
FIG. 7 is a flowchart illustrating an interpolation process in accordance with disclosed embodiments.
Figure 8:
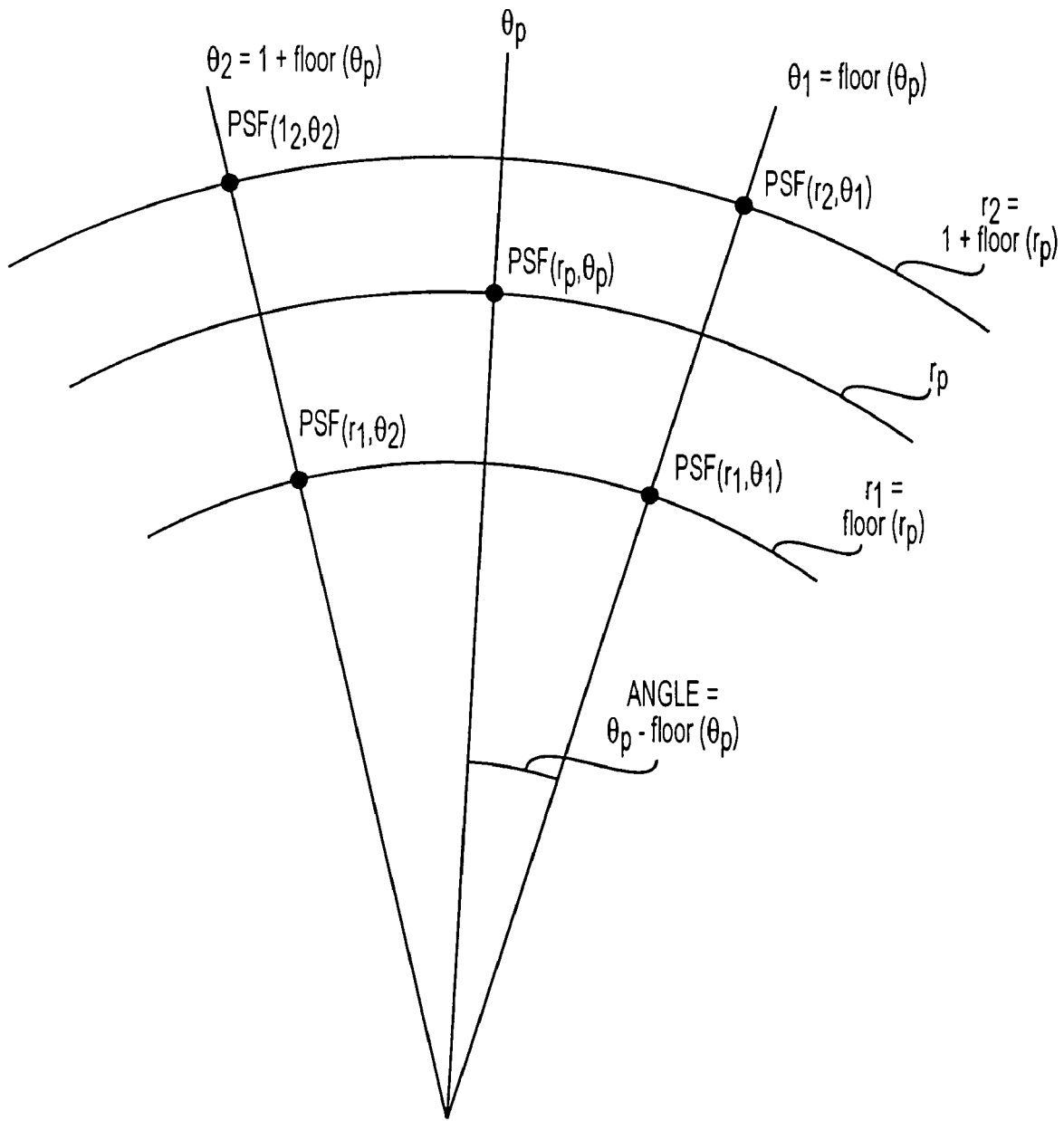
FIG. 8 is a diagram illustrating points in the look-up table and an input point in accordance with disclosed embodiments.

Referring to FIGS. 7 and 8, the interpolation process (step 180) is now described in more detail. FIG. 7 is a flowchart illustrating the process of step 180. FIG. 8 is a two-dimensional diagram illustrating the point spread functions that have been pre-calculated (step 140) for the specified wavelength $\lambda 1$ that correspond to points near the point that was input at step 150. Specifically, FIG. 8 shows the coordinate input at step 150: (rp, θp). Additionally, FIG. 8 shows the four surrounding positions: coordinate (r1, θ1), coordinate (r1, θ2), coordinate (r2, θ1) and coordinate (r2, θ2). As explained above, the point spread functions at the four coordinates surrounding the input point (rp, θp), were previously generated and stored in system 60 (step 140). Note that the point spread function at coordinate (rp, θp) is unknown because it was not computed during the look-up table generation process.

At step 200, the values of the four points in the look-up table surrounding the input point are determined. The values of r1 and θ1 are determined according to Equations (1) and (2):

$$r1 = \text{floor}(rp), \text{ and} \quad (1)$$

$$\theta 1 = \text{floor}(\theta p). \quad (2)$$

The "floor" function returns the largest whole values of r and θ below rp and θp, respectively. Next, r2 is determined by adding to r1 the distance between the radial height of r1 and the radial height of r2. Then, θ2 is determined by adding the predetermined angular interval to θ1. For example, if the look-up table was generated having 36 angular position, r2 and θ2 would be calculated according to Equations (3) and (4):

$$r2 = r1 + 1, \text{ and} \quad (3)$$

$$\theta 2 = \theta 1 + 10°. \quad (4)$$

Similarly, if the look-up table was generated with 360 angular positions (as opposed to 36), then only 1° would be added to θ1 in Equation (4). The four look-up table points surrounding the input point are (r1, θ1), (r1, θ2), (r2, θ1) and (r2, θ2).

After determining the four look-up table points surrounding the input point, the point spread functions associated with the four points at step 210 are extracted. As shown in FIG. 8, these values correspond to PSF(r1, θ1), PSF(r1, θ2), PSF(r2, θ1) and PSF(r2, θ2).

Once the four surrounding point spread functions have been determined, the point spread function associated with the input point through weighted linear interpolation can be determined at steps 220 and 230. This interpolation involves determining the distances between the input point and the surrounding points to generate weighting values, then multiplying the pre-calculated point spread functions by the weighting value.

Angular interpolation is performed at step 220. An angular interpolation procedure is shown in Equations (5), (6) and (7):

$$wt\_angle = \theta_p - \theta_1 \quad (5)$$

$$PSF(r1, \theta p) = (1 - wt\_angle) * PSF(r1, \theta 1) + (wt\_angle) * PSF(r1, \theta 2) \quad (6)$$

$$PSF(r2, \theta p) = (1 - wt\_angle) * PSF(r2, \theta 1) + (wt\_angle) * PSF(r2, \theta 2) \quad (7)$$

where wt_angle is the weighting value in the angular direction and is equal to the angular distance between point P and point 1 and PSF(r1, θp) and PSF(r2, θp) are the point spread functions for points located at radial locations 1 and 2, but with the angular location of point P.

Next, at step 230, radial interpolation is performed to determine the PSF at point (rp, θp). The following equations illustrate this procedure:

$$wt\_radial = rp - r1; \quad (8)$$

$$PSF(rp, \theta p) = (1 - wt\_radial) * PSF(r1, \theta p) + (wt\_radial) * PSF(r2, \theta p); \quad (9)$$

where, similar to above, wt_radial is the weighting value in the radial direction and is equal to the radial distance between point P and point 1 and PSF(rp, θp) is the point spread function for point P. Once PSF(rp, θp) is determined, the function that has been generated is output at step 240.

FIG. 7 shows a process of determining the point spread function at a single point in an image plane using a pre-calculated look-up table. Of course, designers will often need to know the point spread functions at points throughout image 50. This may be accomplished by repeating the steps shown in FIG. 7 for various points P located throughout image 50.

Figure 9:
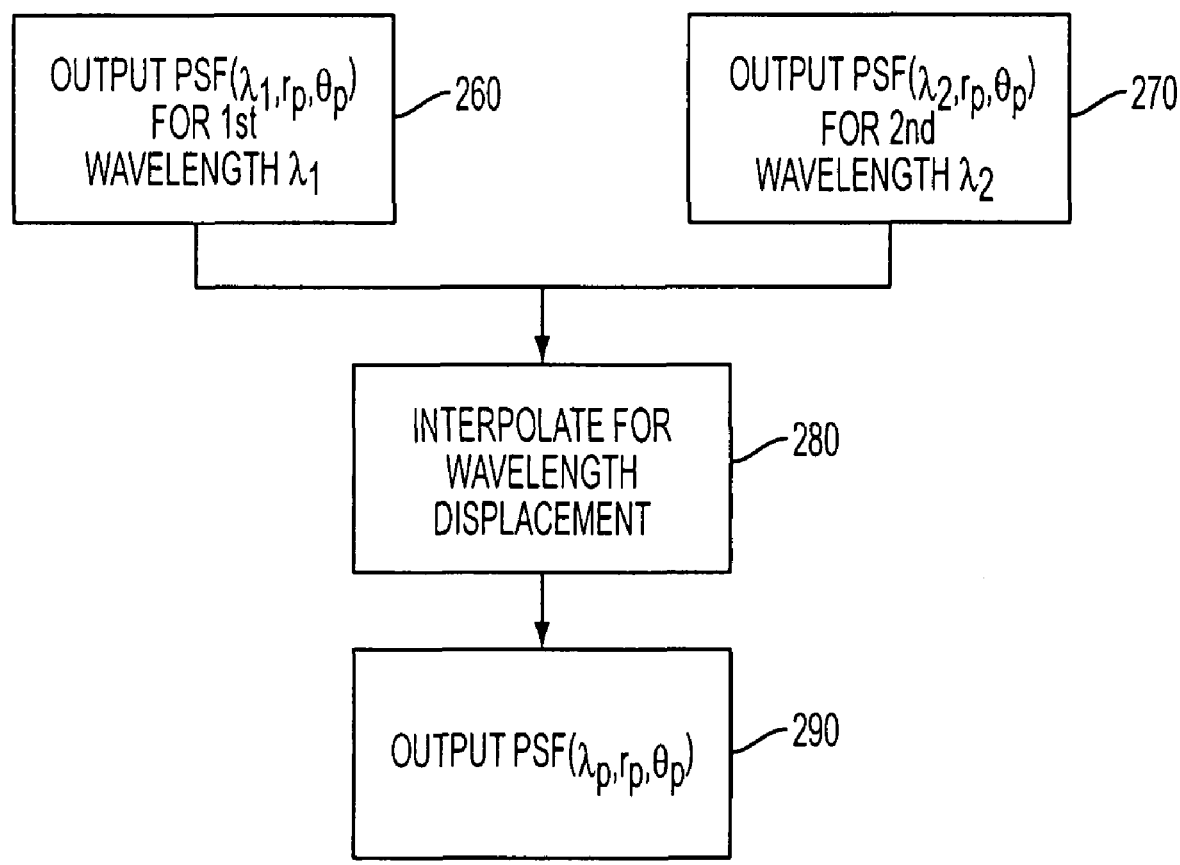
FIG. 9 is a flowchart illustrating another interpolation process in accordance with disclosed embodiments.
Figure 10:
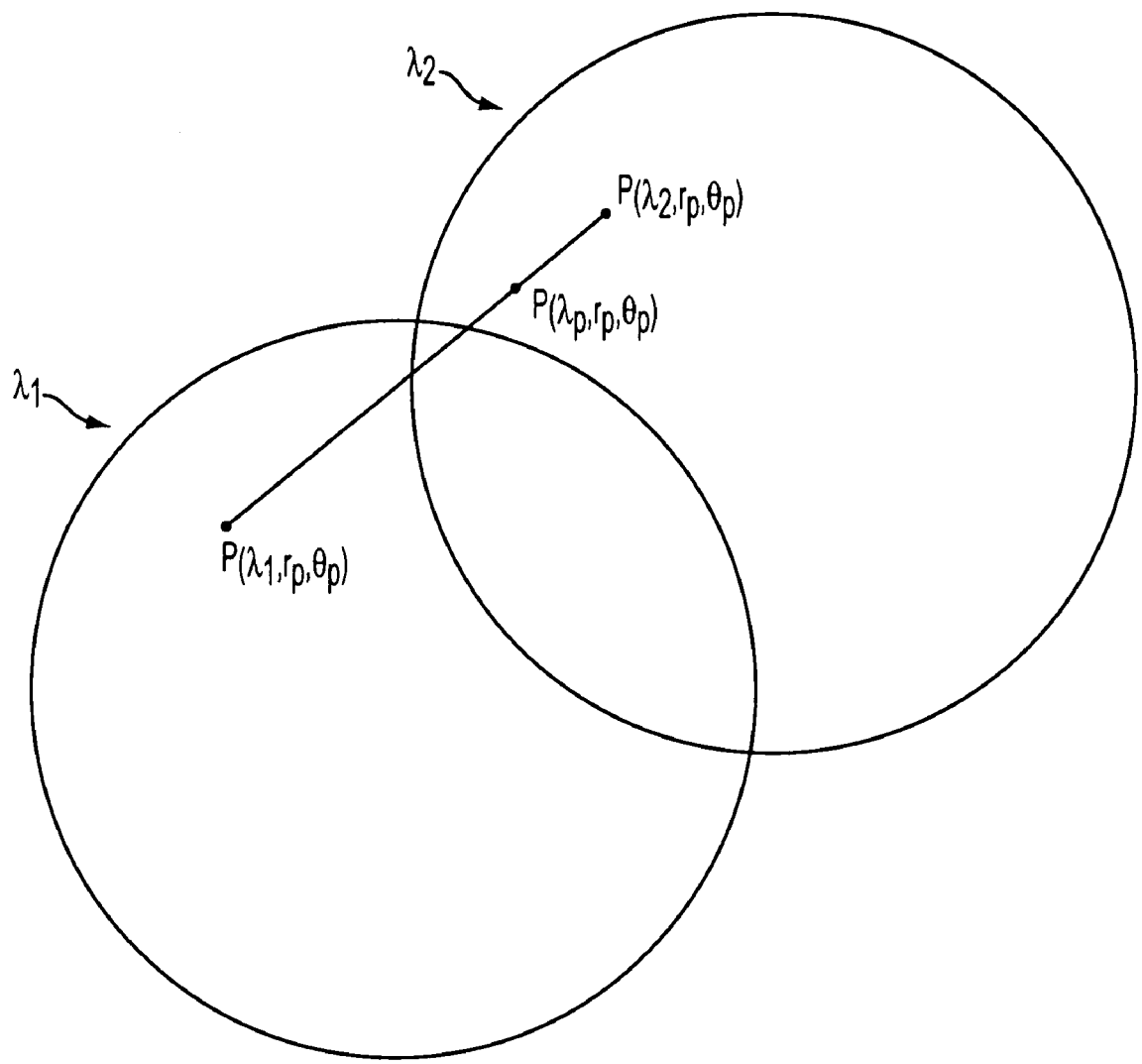
FIG. 10 is another diagram illustrating points in the look-up table and an input point in accordance with disclosed embodiments.

The process illustrated by FIGS. 7 and 8 assumes the input point is associated with a wavelength included in the look-up table, such as $\lambda 1$, $\lambda 2$, or $\lambda 3$ shown in FIGS. 5a-6c. However, the system 60 and method 135 can also be used to determine the point spread function for wavelengths that have not been pre-calculated and stored in the look-up table, using a similar interpolation process. FIG. 9 illustrates a flowchart of such a process. FIG. 10 is a diagram showing the input value in relation to pre-calculated values for first and second wavelengths $\lambda 1$ and $\lambda 2$.

At step 260, the point spread function at point (rp, θp) is determined for the first wavelength, $\lambda 1$. At step 270, the point spread function at point (rp, θp) is determined for the second wavelength, $\lambda 2$. Steps 260 and 270 are implemented in accordance with the process shown in FIG. 7. Once these two point spread functions have been determined, a wavelength interpolation process that is similar to the angular and radial interpolation processes described above can be performed at step 280. First, a weighting value based on the distance between the input wavelength ($\lambda p$) and the next lower wavelength for which point spread functions are stored in the look-up table ($\lambda 1$) is determined. Based on this weighting value, the point spread function at ($\lambda 1$, rp, θp) can be determined by interpolation, in accordance with Equations (10) and (11):

$$wt\_w1 = \lambda p - \lambda 1; \quad (10)$$

$$PSF(\lambda p, rp, \theta p) = (1 - wt\_w1) * PSF(\lambda 1, rp, \theta p) + (wt\_w1) * PSF(\lambda 2, rp, \theta p); \quad (11)$$

where, similar to above, wt_w1 is the weighting value in the wavelength direction and is equal to the distance between the wavelengths of point P and point 1 and PSF($\lambda p$, rp, θp) is the point spread function for point P. At step 290, the determined point spread function for the input point is output.

The point spread function data determined in accordance with disclosed embodiments may be used to perform a convolution operation of an ideal image at each point position, as is known in the art, to complete the modeling of the optical system.

The disclosed embodiments have been described herein using polar coordinates. However, it should be noted that embodiments could use any other type of coordinate system, such as a Cartesian coordinate system.

As a further benefit, the size of the look-up table may be reduced. To reduce the size of the look-up table, its values can be downsampled. Downsampling means that the samples rate of a signal is reduced. This is usually done to reduce the data rate or the size of the data. For example, the resolution of the look-up table could be downsampled to match the resolution of the image sensor 20. Additionally, the point spread function data can be resampled to match the resolution of the optical image.

Figure 11:
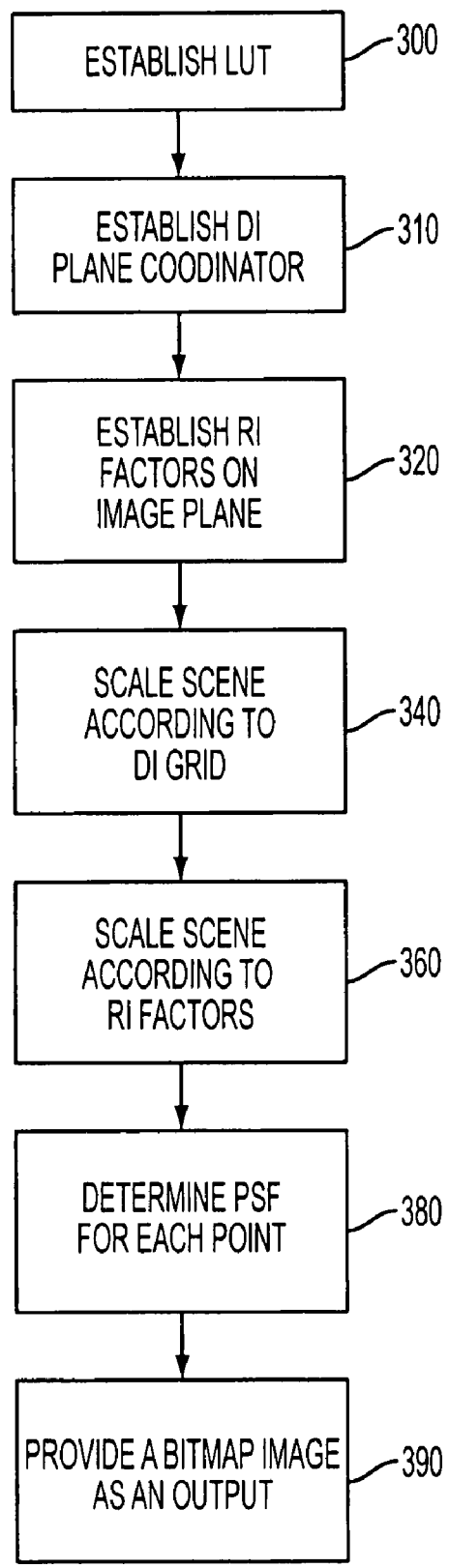
FIG. 11 is a flowchart illustrating a modeling process in accordance with disclosed embodiments.

The above described methods of determining the point spread function of a point on an image plane can also be used as part of a larger modeling operation that includes, for example, the use of a distorted image grid and/or relative illumination factors. FIG. 11 illustrates one such operation. After establishing the look-up table at step 300, a grid of distorted image ("DI") plane coordinates that correspond to the field height coordinates used in the look-up table can be determined (step 310). Next, at step 320, relative illumination factors ("RI") on the image plane corresponding to the field height coordinates from a raytracing program or from experimental measurements can be determined. The input scene could then be scaled according to the DI grid (step 340) and the amplitudes of each point of the input scene could then be scaled according to the RI data (step 360). Steps 310, 320, 340 and 360 are performed in accordance with known methods in the art. The point spread functions at each point of the input scene could be determined (step 380) using the processes described above and applied to the input scene. Then the modeled scene could be output as a bitmap image (step 390).

While various embodiments have been described above, it should be understood that they have been presented by way of example, and not limitation. It will be apparent to persons skilled in the relevant art(s) that various changes in form and detail can be made therein.

What is claimed as new and desired to be protected by Letters Patent of the United States is:

1. A method of determining a point spread function at a specified point in an optical image, the method comprising:
    with computing equipment, generating a data structure associating predetermined point spread functions with predetermined points in the optical image and with wavelengths;
    with the computing equipment, determining the point spread function at the specified point according to the predetermined point spread functions, wherein the point spread function associated with the specified point is not stored in the data structure; and
    with the computing equipment, determining the point spread function based on a specified wavelength by interpolating a difference between the specified wavelength and a wavelength associated with at least one of the predetermined point spread functions, wherein the point spread function associated with the specified wavelength is not stored in the data structure.

2. The method of claim 1, further comprising:
    with the computing equipment, determining the point spread function at the specified point by interpolation of a plurality of the predetermined point spread functions.

3. The method of claim 2, wherein the interpolation is based on a plurality of the predetermined point spread functions associated with points surrounding the specified point.

4. The method of claim 2, wherein the interpolation is based on distances between the specified point and a plurality of points surrounding the specified point.

5. The method of claim 4, wherein the distances include a radial distance component and an angular component.

6. The method of claim 1, further comprising:
    with the computing equipment, scaling the optical image in accordance with a predetermined grid of distorted image plane coordinates.

7. The method of claim 1, further comprising:
    with the computing equipment, scaling the optical image in accordance with predetermined relative illumination factors.

8. A non-transitory computer-readable storage medium comprising:
    instructions causing a data processing system to implement a method comprising:
        generating a data structure storing point spread functions associated with points in an optical image and with wavelengths;
        determining the point spread function at the specified point in the optical image based on the stored point spread functions, wherein the point spread function associated with the specified point is not stored in the data structure; and
        determining the point spread function based on a specified wavelength by interpolating a difference between the specified wavelength and a wavelength associated with at least one of the predetermined point spread functions, wherein the point spread function associated with the specified wavelength is not stored in the data structure.

9. The non-transitory computer-readable storage medium of claim 8, wherein the instructions cause the data processing system to implement a method further comprising determining the point spread function at the specified point by interpolation of a plurality of the predetermined point spread functions, wherein the plurality of the predetermined point spread functions are associated with points surrounding the specified point.

* * * * *